United States Patent
Lu et al.

(10) Patent No.: US 7,780,295 B2
(45) Date of Patent: Aug. 24, 2010

(54) AIR GUIDING STRUCTURE AND PROJECTING DEVICE INCORPORATING THE SAME

(75) Inventors: Sheng-Chang Lu, Penghu County (TW); Tzu-Huan Hsu, Taipei County (TW); Chun-Ming Shen, Taipei (TW)

(73) Assignee: Qisda Corporation, Taoyuan County (TW)

( * ) Notice: Subject to any disclaimer, the term of this patent is extended or adjusted under 35 U.S.C. 154(b) by 809 days.

(21) Appl. No.: 11/621,592

(22) Filed: Jan. 10, 2007

(65) Prior Publication Data

US 2007/0263175 A1    Nov. 15, 2007

(30) Foreign Application Priority Data

Jan. 20, 2006    (TW) .............................. 95102298 A

(51) Int. Cl.
*G03B 21/16* (2006.01)
*G03B 21/14* (2006.01)
(52) U.S. Cl. ............................. 353/60; 353/61; 353/119
(58) Field of Classification Search ............. 353/60–61, 353/52, 119
See application file for complete search history.

(56) References Cited

U.S. PATENT DOCUMENTS

| 6,443,575 | B1 * | 9/2002 | Miyamoto et al. ............. 353/58 |
| 6,623,125 | B2 * | 9/2003 | Chen et al. ..................... 353/52 |
| 6,902,275 | B2 | 6/2005 | Yamada et al. |
| 7,073,912 | B2 * | 7/2006 | Yanagisawa et al. .......... 353/61 |
| 2004/0075818 | A1 * | 4/2004 | Suzuki et al. .................. 353/61 |
| 2006/0170876 | A1 * | 8/2006 | Takemi et al. ................. 353/61 |
| 2007/0019164 | A1 * | 1/2007 | Nakagawa et al. ............. 353/20 |

FOREIGN PATENT DOCUMENTS

| TW | 549472 | 8/2003 |
| TW | 585280 | 4/2004 |

\* cited by examiner

*Primary Examiner*—Georgia Y Epps
*Assistant Examiner*—Magda Cruz

(57) ABSTRACT

An air guiding structure is applied in a projecting device. The projecting device at least includes an optical element. The air guiding structure includes a first side wall and a second side wall. The first side wall having a first opening is disposed near a side of the optical element. The second side wall having a second opening is disposed near the other side of the optical element. Furthermore, the first side wall and the second side wall are connected to each other. The air is guided into the first opening, circulated through the optical element and is vented out via the second opening.

24 Claims, 4 Drawing Sheets

AIR GUIDING STRUCTURE AND PROJECTING DEVICE INCORPORATING THE SAME

This application claims the benefit of Taiwan application Serial No. 95102298, filed Jan. 20, 2006, the subject matter of which is incorporated herein by reference.

BACKGROUND OF THE INVENTION

1. Field of the Invention

The invention relates in general to a projecting device, and more particularly to a projecting device with an air guiding structure.

2. Description of the Related Art

Referring to FIG. 1, an upward view of partial elements of a conventional projector is shown. The projector 100 includes a housing 110, a lamp module 134, an optical assembly, a cameral lens 140 and a fan 150 (not illustrated). The light generated by the lamp module 134 is transmitted to the cameral lens 140 through the optical assembly and projected onto an external screen. The housing 110 includes an air inlet 115 and an air outlet 155. The fan 150 is disposed near the lamp module 134.

When the projector 100 functions, the fan 150 attracts an air by the air inlet 115 disposed on the housing 110. The air is circulated through the inside of the projector, attracted to the fan 150 and vented via the air outlet 155 so to cool down the internal elements of the projector.

However, it is inevitable that some of the optical elements, the optical element 132 for example, are positioned at a cooling unfriendly position. Moreover, the heat generated by the lamp module 134 may cause the optical element 132 to malfunction. Consequently, the imaging quality is affected. The conventional method is to add a fan to cool down the optical element. However, the installation of a fan not only occupies more internal space of a projector, but also increases noise during operation and incurs more manufacturing costs. Therefore, how to effectively cool down the optical element, save the internal space of the projector, avoid noise and reduce the manufacturing cost of the projector is indeed an imminent issue to be resolved.

SUMMARY OF THE INVENTION

It is therefore an object of the invention to provide an air guiding structure for covering the optical element disposed inside a projecting device such that an air is guided to the air guiding structure to cool down the optical element. Thus, the projecting device does not need a radiator for cooling, not only saving internal space but also reducing manufacturing costs.

The invention achieves the above-identified object by providing an air guiding structure is applied in a projecting device. The projecting device at least includes an optical element. The air guiding structure includes a first side wall and a second side wall. The first side wall having a first opening is disposed near a side of the optical element. The second side wall having a second opening is disposed near the other side of the optical element. Furthermore, the first side wall and the second side wall are connected to each other. The air is guided into the first opening, circulated through the optical element and is vented out via the second opening.

The invention achieves another object by providing a projecting device including a housing, an optical/mechanical assembly (OMA) casing, an optical element, a radiator, an air guiding structure. The housing includes a first gas-venting opening and a second gas-venting opening. The OMA casing is disposed inside the projecting device. The optical element is disposed inside the OMA casing. The radiator is disposed near the optical element for attracting an air. The air guiding structure covers the optical element and includes a first side wall and a second side wall. The first side wall has a first opening. The second side wall having a second opening. Furthermore, the first side wall and the second side wall are connected to each other. The air entering the projecting device via the first gas-venting opening is guided to enter the first opening, circulated through the optical element, vented out via the second opening, attracted to the radiator, and vented out from the projecting device via the second gas-venting opening.

The invention achieves another object by providing a projecting device including a housing, an OMA casing, an optical element, a radiator, and an air guiding structure. The housing includes a first gas-venting opening and a second gas-venting opening. The OMA casing is disposed inside the projecting device. The optical element is disposed inside the OMA casing. The radiator is disposed near the optical element. The air guiding structure covers the optical element and forms a channel with the OMA casing for guiding an air. The air entering the first gas-venting opening is guided into the channel, circulated through the optical element, and vented from the channel. Then the air is vented via the second gas-venting opening by the radiator.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention provides an air guiding structure for partially covering the optical element disposed inside the projecting device, such that an air is guided to enter the air guiding structure to cool down the optical element. Thus, the projecting device does not need a radiator for cooling, not only saving internal space but also reducing manufacturing costs. A preferred embodiment is disclosed below for elaborating the invention. However, the preferred embodiment and accompanied drawings are for elaboration only not for limiting the invention. The scope of protection of the invention is defined in the appended claims.

Figure 1:
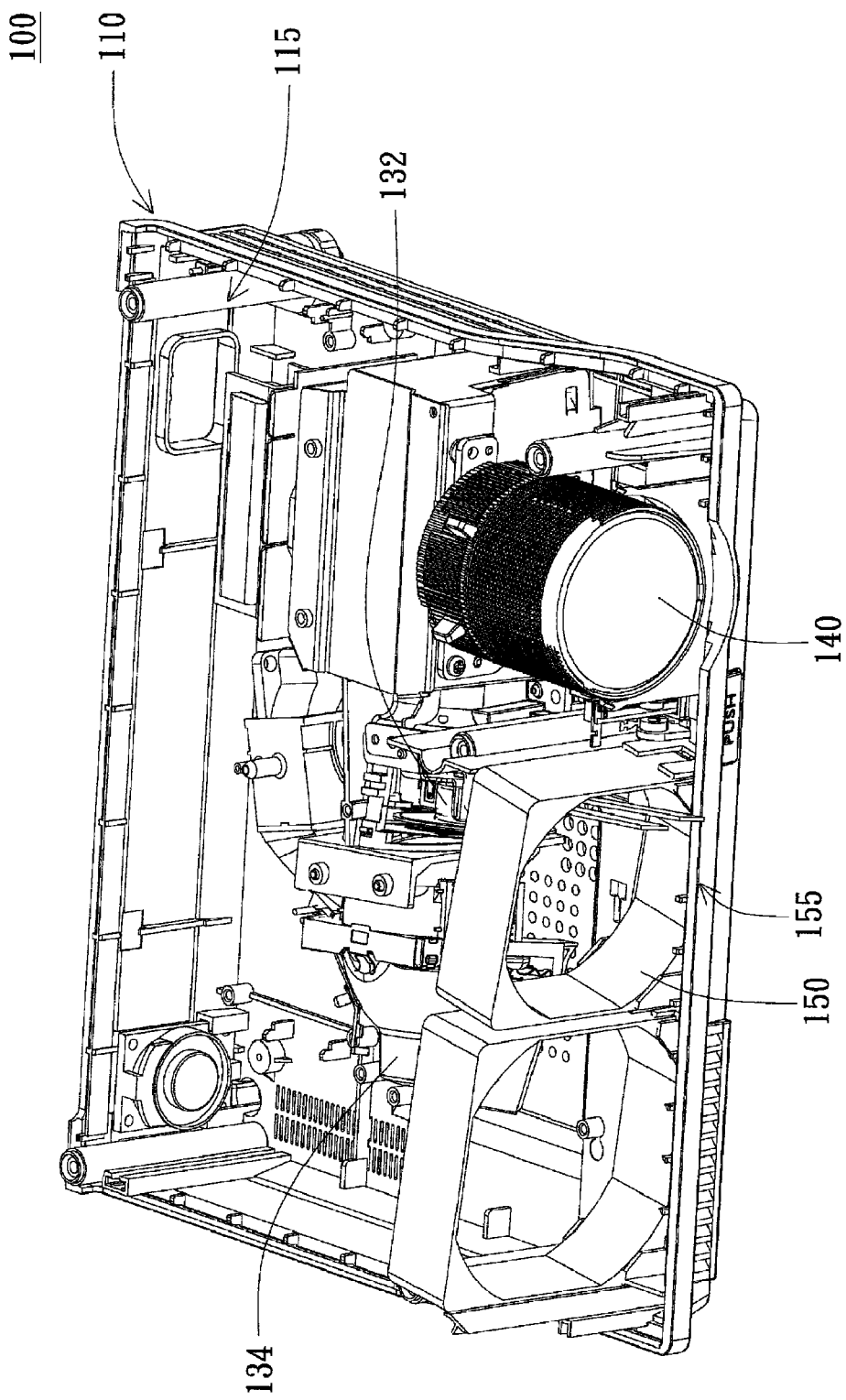
FIG. 1 shows an upward view of partial elements of a conventional projector.
Figure 2:
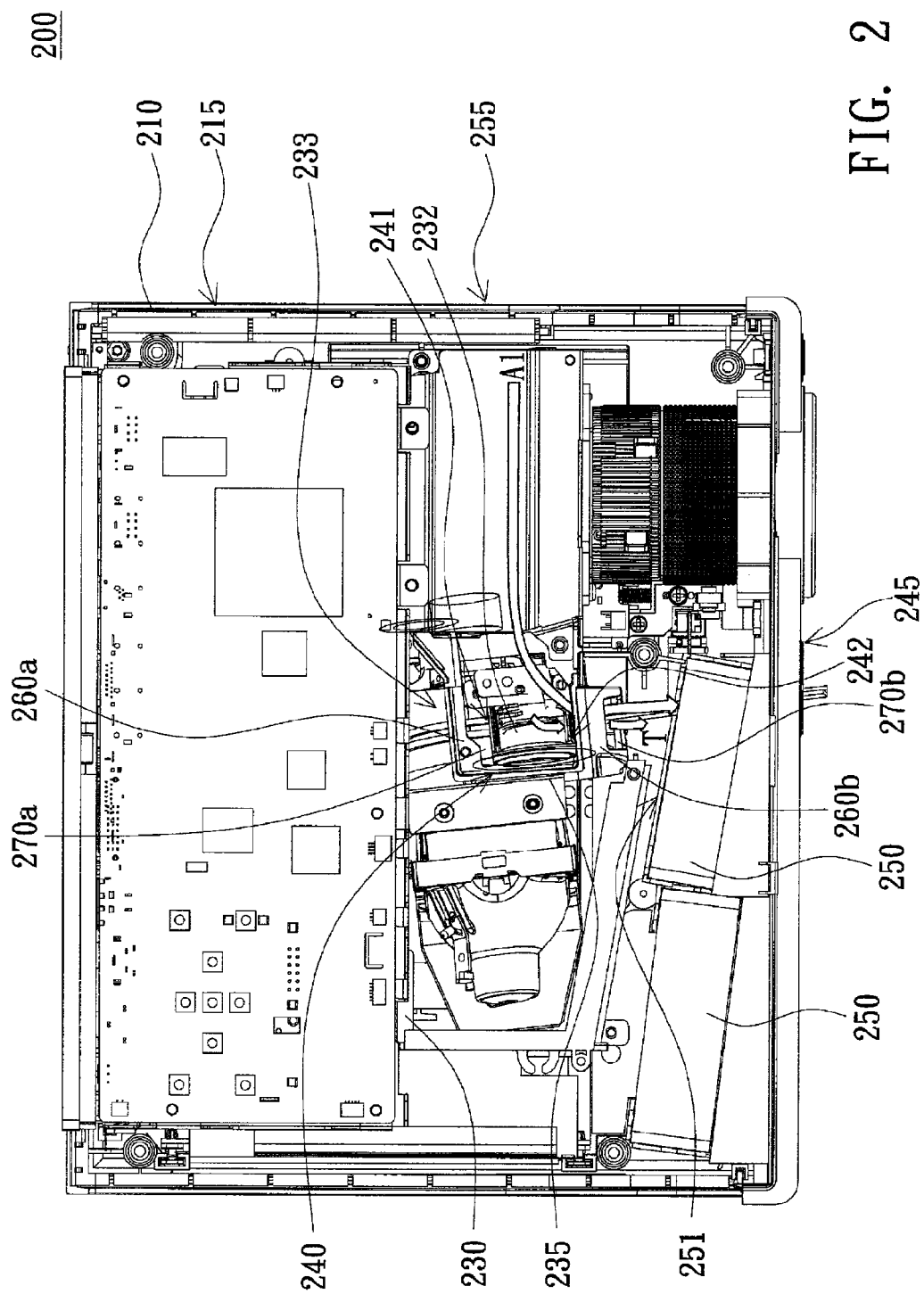
FIG. 2 shows a top view of a projecting device according to a preferred embodiment of the invention.

FIG. 2 shows a top view of a projecting device according to a preferred embodiment of the invention. Referring to FIG. 2, the projecting device 200 includes a housing 210, an optical/mechanical assembly (OMA) casing 230, an optical element 232, a radiator 250 and an air guiding structure 240. The housing 210 includes a first gas-venting opening 215, a second gas-venting opening 245 and a third gas-venting opening 255. The OMA casing 230 is disposed inside the projecting device 200. The optical element 232 is disposed inside the OMA casing 230. The radiator 250, exemplified by a fan, is disposed near the optical element 232 for attracting air A. The air guiding structure 240 partially covers the optical element 232 and forms a channel T with the OMA casing 230 as indicated in FIG. 2. The air A1 entering the third gas-venting opening 255 is guided into the channel T, circulated through the optical element 232, and vented out via the channel T. Then the air A1 is vented out via the second gas-venting opening 245 by the radiator 250.

Figure 3:
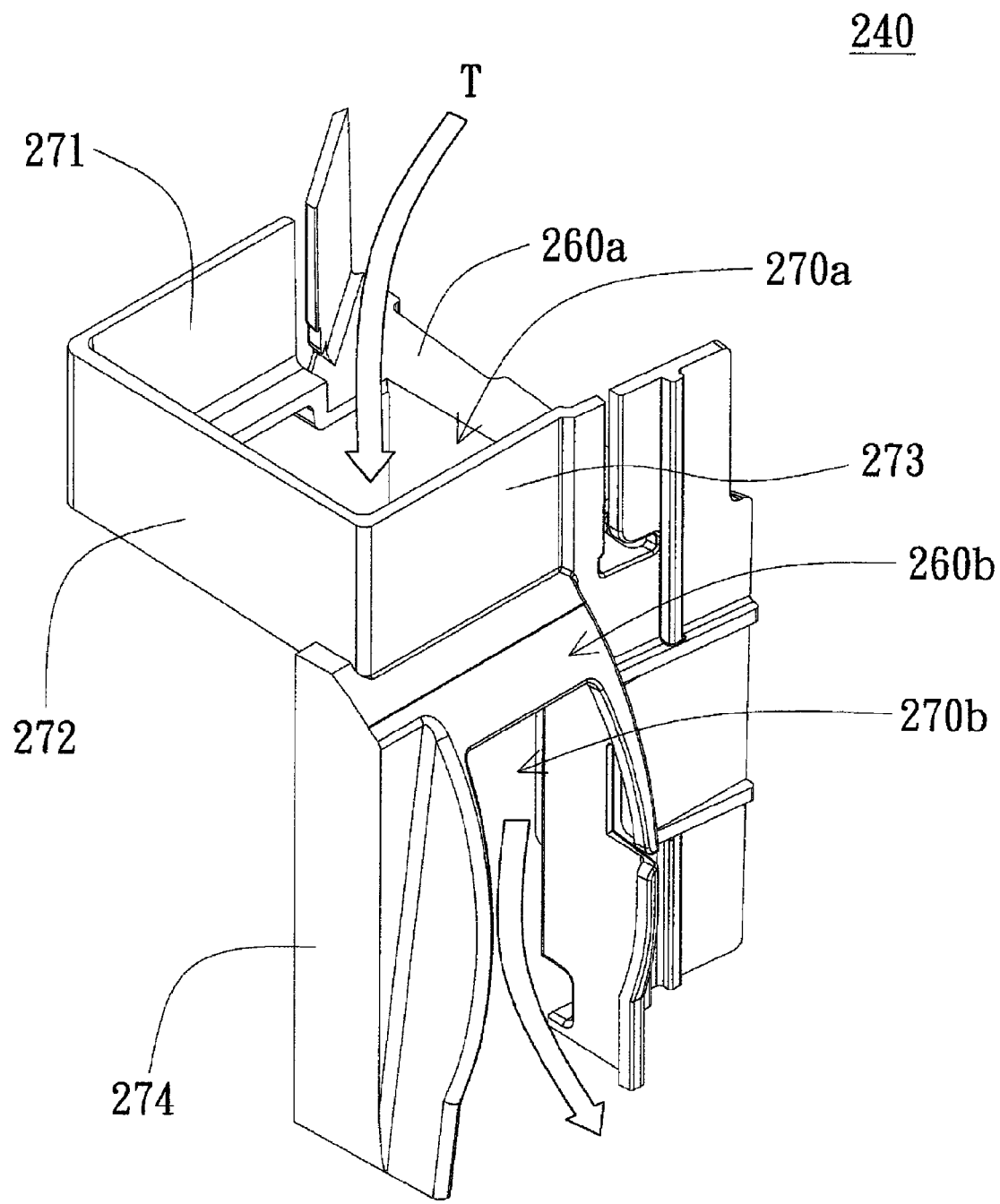
FIG. 3 shows a 3-D perspective of an air guiding structure according to a preferred embodiment of the invention.

FIG. 3 shows a 3-D perspective of an air guiding structure according to a preferred embodiment of the invention. Referring to FIG. 3, the air guiding structure 240 includes a first side wall 260a and a second side wall 260b. The first side wall 260a includes a first opening 270a, a first stopping plate 271, a second stopping plate 272 and a third stopping plate 273. The second side wall 260b has a second opening 270b and a fourth stopping plate 274. Referring to FIG. 2, the first side wall 260a is disposed near one side 241 of the optical element 232, and the second side wall 260b is disposed near the other side 242 of the optical element 232. The first side wall 260a and the second side wall 260b are connected to each other. To be more specifically, the first side wall 260a is disposed above the optical element 232, the second side wall 260b is disposed in front of the optical element 232, and the second side wall 260b is disposed adjacent to one side 251 of the radiator 250.

Referring to both FIG. 2 and FIG. 3, the first stopping plate 271 is substantially perpendicular to the second stopping plate 272, and the second stopping plate 272 is substantially perpendicular to the third stopping plate 273. The first stopping plate 271 abuts against one side 233 of the OMA casing 230. The fourth stopping plate 274 is substantially perpendicular to the second stopping plate 272. The second stopping plate 272 and the fourth stopping plate 274 abut against the other side 235 of the OMA casing 230. The first stopping plate 271, the second stopping plate 272 and the third stopping plate 273 stop the air A1 coming from the third gas-venting opening 255, such that the air A1 is guided to enter the first opening 270a to cool down the optical element 232, and vented out via the second opening 270b.

Figure 4:
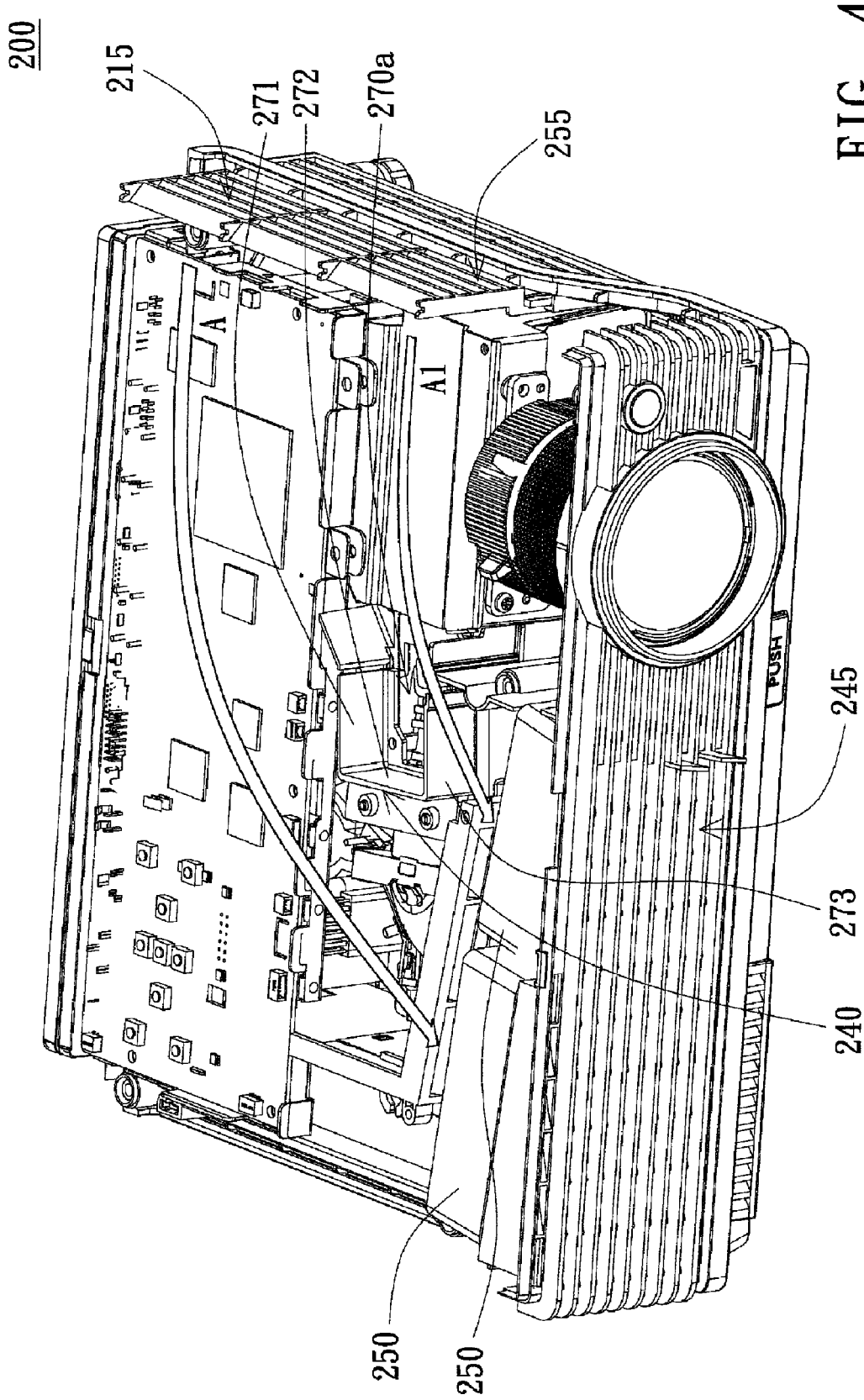
FIG. 4 shows an upward view of the projecting device of FIG. 2.

Referring to FIG. 4, an upward view of the projecting device of FIG. 2 is shown. When the projecting device 200 functions, the air A entering the projecting device 200 via the first gas-venting opening 215 is guided to enter the air guiding structure 240. Furthermore, in the air guiding structure 240, the first stopping plate 271, the second stopping plate 272 and the third stopping plate 273 are used to stop the air A, such that part of the air A is guided to the first opening 270a, circulated through the optical element 232, vented out via the second opening 270b, attracted to the radiator 250, and vented out from the projecting device 200 via the second gas-venting opening 245. The invention uses the radiator 250 to attract and guide the air A to the air guiding structure 240 to cool down the optical element 232. With the air guiding structure 240, there is no need to install a radiator in the projecting device 200 to cool down the optical element 230. Thus, the invention not only saves internal space but also reduces manufacturing costs and noise problem.

Referring to FIG. 4 again, the third gas-venting opening 255 on the housing 210 is opposite to the first opening 270a. When the radiator 250 functions, the air A1 is attracted to enter the first opening 270a of the projecting device 200, circulated through the optical element 232 and vented out via the second opening 270b to cool down the optical element 232. Furthermore, when the air guiding structure 240 is incorporated with the third gas-venting opening 255, the cooling effect of the air guiding structure 240 is even enhanced and the temperature of the optical element 232 is cooled down to an appropriate temperature more quickly and efficiently. The optical element 232 is a color wheel or an LCD pane, and the projecting device is a projector or a back projection TV.

According to the air guiding structure and the projecting device incorporating the same disclosed in the above embodiment of the invention, an air guiding structure is disposed on an optical element of the projecting device. The air guiding structure guides an air to circulate through the optical element, such that the optical element is cooled down to an appropriate temperature. Thus, the projecting device does not need a radiator for cooling, not only saving internal space but also reducing manufacturing costs.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An air guiding structure applied in a projecting device, wherein the projecting device comprises an optical element, and the air guiding structure comprises:
    a first side wall having a first opening, wherein the first side wall is disposed near a side of the optical element and disposed above the optical element; and
    a second side wall having a second opening, wherein the second side wall is disposed near the other side of the optical element and disposed in front of the optical element and adjacent to a radiator, and the first side wall and the second side wall are connected to each other;
    wherein an air is guided into the first opening, circulated through the optical element, and vented out via the second opening.

2. The air guiding structure according to claim 1, wherein the first side wall comprises a first stopping plate, a second stopping plate and a third stopping plate, the first stopping plate is substantially perpendicular to the second stopping plate, the second stopping plate is substantially perpendicular to the third stopping plate, and the first stopping plate abut against a side of the optical/mechanical assembly (OMA) casing for guiding the air to enter the first opening.

3. The air guiding structure according to claim 2, wherein the second side wall comprises a fourth stopping plate substantially perpendicular to the second stopping plate, and the second stopping plate and the fourth stopping plate abut against the other side of the OMA casing.

4. The air guiding structure according to claim 1, wherein the optical element is a color wheel.

5. The air guiding structure according to claim 1, wherein the optical element is a liquid crystal display (LCD) panel.

6. A projecting device, comprising:
    a housing comprising a first gas-venting opening and a second gas-venting opening;
    an optical/mechanical assembly (OMA) casing disposed inside the projecting device;
    an optical element disposed inside the OMA casing;
    a radiator disposed near the optical element for attracting an air; and
    an air guiding structure for covering the optical element, wherein the air guiding structure comprises:
    a first side wall having a first opening; and
    a second side wall having a second opening, wherein the first side wall and the second side wall are connected to each other;
    wherein the air entering the projecting device via the first gas-venting opening is guided to enter the first opening, circulated through the optical element, vented out via the second opening, attracted to the radiator, and vented from the projecting device via the second gas-venting opening.

7. The projecting device according to claim 6, wherein the first side wall is disposed above the optical element.

8. The projecting device according to claim 7, wherein the second side wall is disposed in front of the optical element and adjacent to a side of the radiator.

9. The projecting device according to claim 8, wherein the first side wall comprises a first stopping plate, a second stopping plate and a third stopping plate, the first stopping plate is substantially perpendicular to the second stopping plate, the second stopping plate is substantially perpendicular to the third stopping plate, and the first stopping plate abut againsts against a side of the OMA casing for guiding an air to enter the first opening.

10. The projecting device according to claim 9, wherein the second side wall comprises a fourth stopping plate substantially perpendicular to the second stopping plate, and the second stopping plate and the fourth stopping plate abut against the other side of the OMA casing.

11. The projecting device according to claim 6, wherein the housing has a third gas-venting opening opposite to the first opening, and the air entering the projecting device via the third gas-venting opening enters the first opening directly.

12. The projecting device according to claim 6, wherein the optical element is a color wheel.

13. The projecting device according to claim 6, wherein the optical element is a liquid crystal display (LCD) panel.

14. The projecting device according to claim 6, wherein the projecting device is a projector.

15. A projecting device, comprising:
  a housing comprising a first gas-venting opening and a second gas-venting opening;
  an optical/mechanical assembly (OMA) casing disposed inside the projecting device;
  an optical element disposed inside the OMA casing;
  a radiator disposed near the optical element; and
  an air guiding structure for covering the optical element, wherein the air guiding structure forms a channel with the OMA casing for guiding an air;
  wherein, after the air entering the first gas-venting opening is guided to enter the channel, circulated through the optical element and vented from the channel, the air is vented out via the second gas-venting opening by the radiator.

16. The projecting device according to claim 15, wherein the air guiding structure comprises:
  a first side wall having a first opening, wherein the first side wall is disposed near a side of the optical element; and
  a second side wall having a second opening, wherein the second side wall is disposed near the other side of the optical element, and the first side wall and the second side wall are connected to each other;
  wherein, the air is guided into the first opening, circulated through the optical element, and vented out via the second opening.

17. The projecting device according to claim 16, wherein the first side wall is disposed above the optical element.

18. The projecting device according to claim 16, wherein the second side wall is disposed in front of the optical element and adjacent to a side of the radiator.

19. The projecting device according to claim 18, wherein the first side wall comprises a first stopping plate, a second stopping plate and a third stopping plate, the first stopping plate is substantially perpendicular to the second stopping plate, the second stopping plate is substantially perpendicular to the third stopping plate, and the first stopping plate abut againsts against a side of the OMA casing for guiding an air to enter the first opening.

20. The projecting device according to claim 19, wherein the second side wall comprises a fourth stopping plate substantially perpendicular to the second stopping plate, and the second stopping plate and the fourth stopping plate abut against the other side of the OMA casing.

21. The projecting device according to claim 15, wherein the housing further has a third gas-venting opening opposite to the first opening, and the air entering the projecting device via the third gas-venting opening enters the first opening directly.

22. The projecting device according to claim 15, wherein the optical element is a color wheel.

23. The projecting device according to claim 15, wherein the optical element is a liquid crystal display (LCD) panel.

24. The projecting device according to claim 15, wherein the projecting device is a projector.

* * * * *